(12) United States Patent
Spahic

(10) Patent No.: US 11,283,251 B2
(45) Date of Patent: Mar. 22, 2022

(54) ELECTRICAL CONDUIT SOCKET FOR A ROUND-TOP LOCKING HUB NUT

(71) Applicant: KIST INC., Palatine, IL (US)

(72) Inventor: Rifet Spahic, Palatine, IL (US)

(73) Assignee: R&D Holdings, Inc., Palatine, IL (US)

( * ) Notice: Subject to any disclaimer, the term of this patent is extended or adjusted under 35 U.S.C. 154(b) by 605 days.

(21) Appl. No.: 15/891,359

(22) Filed: Feb. 7, 2018

(65) Prior Publication Data

US 2019/0273368 A1 Sep. 5, 2019

Related U.S. Application Data

(60) Provisional application No. 62/431,436, filed on Dec. 8, 2016.

(51) Int. Cl.
| | |
|---|---|
| H02G 3/06 | (2006.01) |
| H01R 31/06 | (2006.01) |
| H01R 13/74 | (2006.01) |
| H02G 3/04 | (2006.01) |
| H01R 24/76 | (2011.01) |

(52) U.S. Cl.
CPC .......... *H02G 3/0608* (2013.01); *H01R 13/746* (2013.01); *H01R 24/76* (2013.01); *H01R 31/06* (2013.01); *H02G 3/0418* (2013.01); *H02G 3/0481* (2013.01)

(58) Field of Classification Search
CPC .......... H02G 3/0608; H02G 3/06; H02G 3/00; H02G 3/04; H02G 3/0406; H02G 3/0616; H02G 3/24; H02G 3/0418; H02G 3/0481; H01R 24/76; H01R 31/06; H01R 13/746; H01R 13/73; H01R 13/74

USPC .... 174/50, 68.1, 68.3, 135, 559, 88 R, 70 C, 174/95, 40 CC, 84 R, 660, 72 A; 248/68.1, 49, 74.1, 74.2
See application file for complete search history.

(56) References Cited

U.S. PATENT DOCUMENTS

| | | | | |
|---|---|---|---|---|
| 4,739,126 A * | 4/1988 | Gutter | .................... | H02G 3/065 |
| | | | | 174/655 |
| 7,582,835 B2 * | 9/2009 | Pyron | ...................... | H02G 3/06 |
| | | | | 174/24 |
| 7,735,876 B2 * | 6/2010 | Chiu | .................... | H02G 3/0675 |
| | | | | 174/655 |
| 7,868,252 B2 * | 1/2011 | Spahic | .................. | H02G 3/065 |
| | | | | 174/660 |
| 7,902,459 B2 * | 3/2011 | Lehr | ....................... | H02G 3/14 |
| | | | | 174/481 |
| 8,013,250 B2 * | 9/2011 | Hurrell | ................ | F16B 37/067 |
| | | | | 174/93 |
| 8,129,633 B1 * | 3/2012 | Shemtov | .............. | H02G 3/0675 |
| | | | | 174/652 |
| 8,779,304 B2 * | 7/2014 | Spilker | .................... | H02G 3/22 |
| | | | | 174/653 |
| 10,522,988 B2 * | 12/2019 | Morse | ..................... | H02G 3/06 |

* cited by examiner

*Primary Examiner* — Angel R Estrada
(74) *Attorney, Agent, or Firm* — Juneau & Mitchell IP Law Firm; Todd L. Juneau

(57) ABSTRACT

The invention relates to an electrical connector socket configured to work operatively with a locking hub nut having a rounded top sidewall that does not damage the wiring during pulling, frees up manpower by allowing one person rather than two to be able to do the pulling, has a simplified design, and which has universal threading for conduit of all currently approved sizes and materials.

7 Claims, 13 Drawing Sheets

FIGURE 4
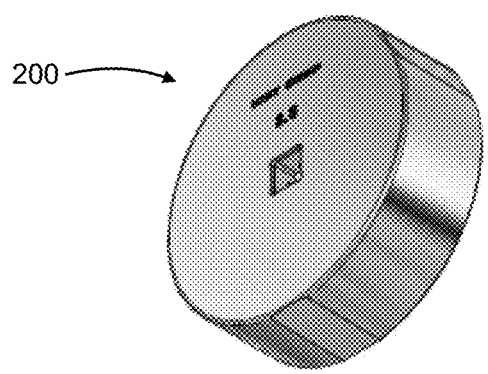
200
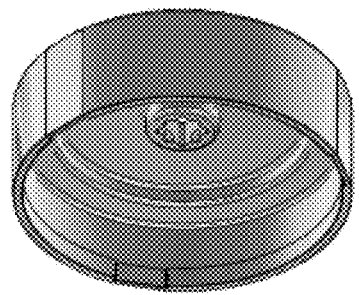

FIGURE 5
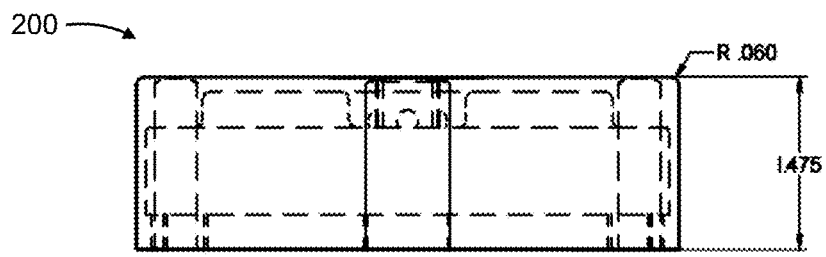
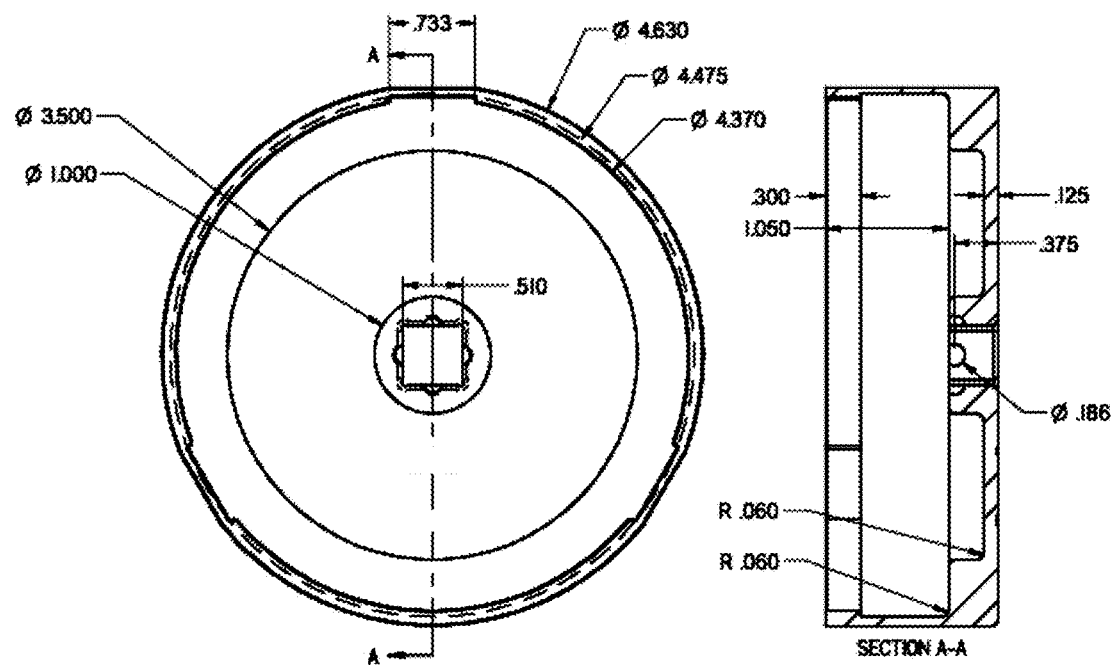

FIGURE 6
300 →
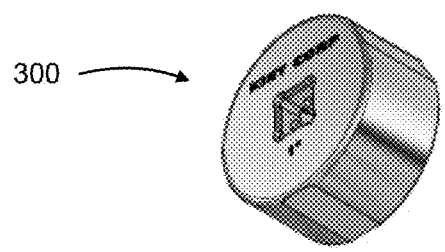
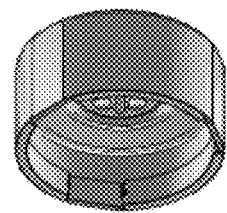

FIGURE 7
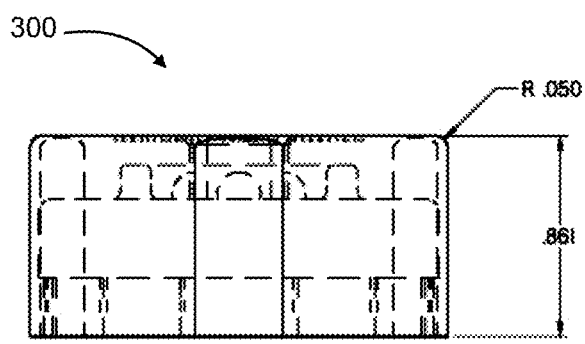
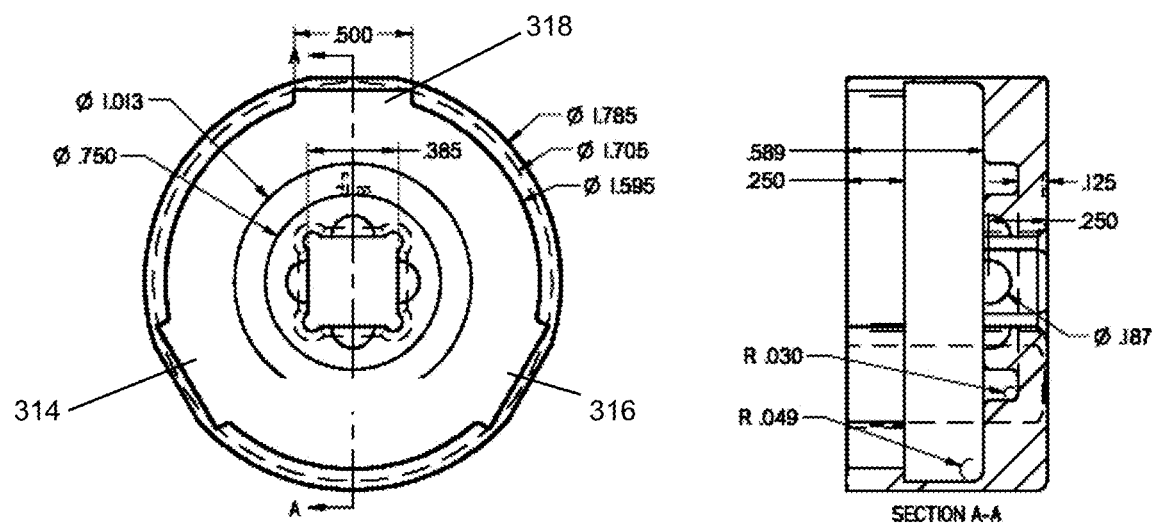

400

FIGURE 9
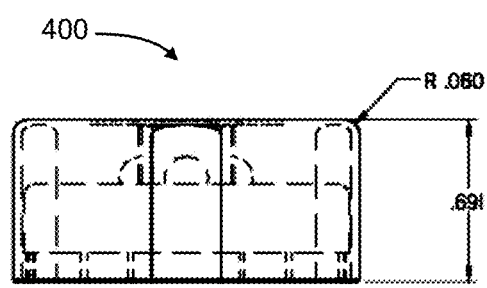
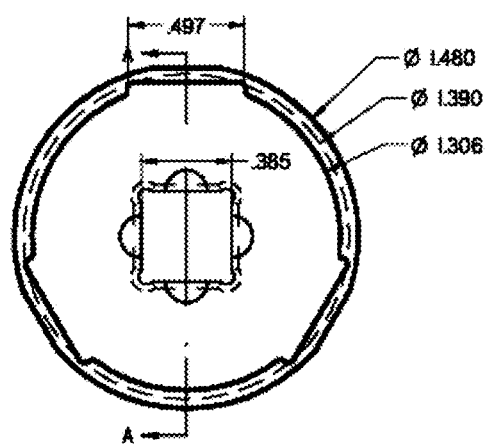
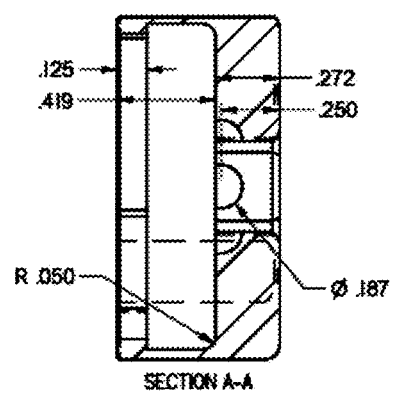

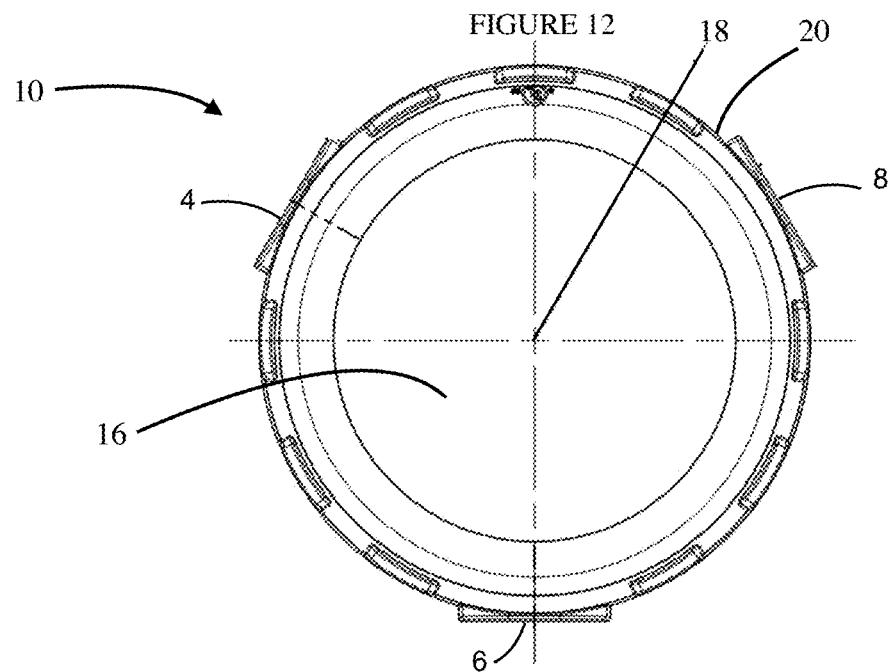
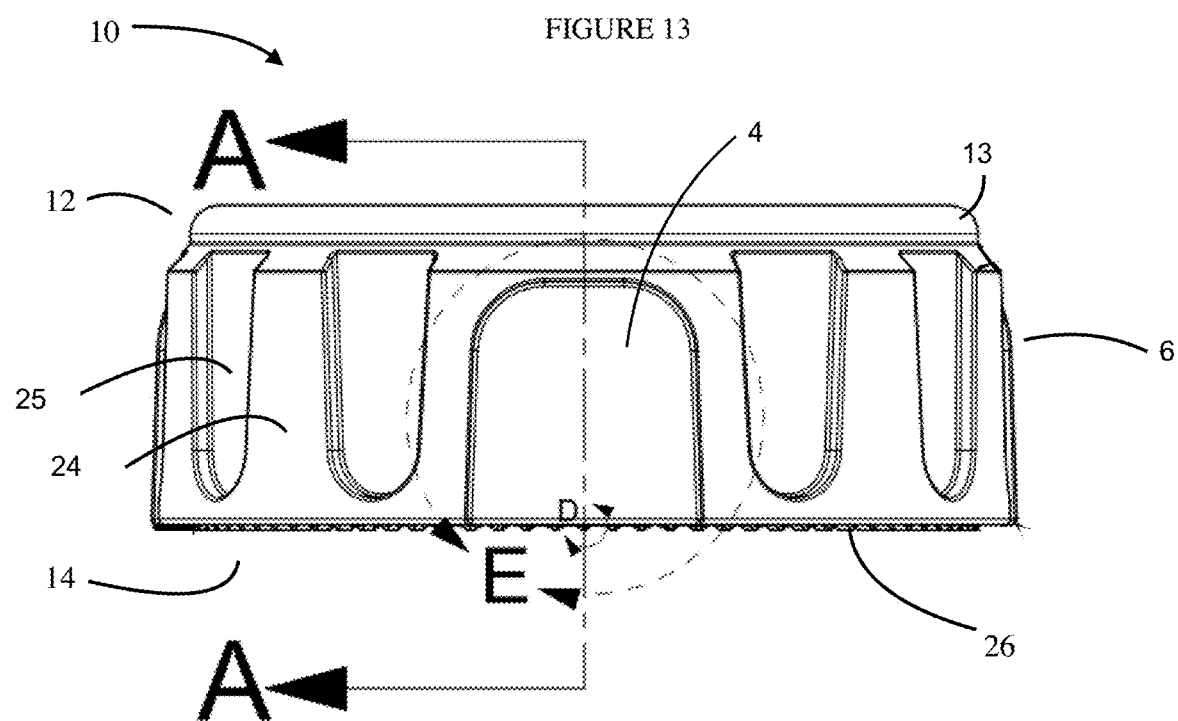

LUG holes version shown

NO-LUG holes version shown

ELECTRICAL CONDUIT SOCKET FOR A ROUND-TOP LOCKING HUB NUT

BACKGROUND

Field of the Invention

This invention relates to improved electrical fittings used in the installation of electrical conduit, and namely a socket configured to interlock or couple with an improved electrical conduit lock nut or locking hub nut.

Background of the Invention

The current state of knowledge is as follows. Electrical conduit is a system used for protection and routing of electrical wiring. Electrical conduit is generally made of metal or plastic polymers, and protects the wiring from mechanical damage and chemical interference, e.g. water. Conduit also requires the use of special fittings for connections, end points, and so forth. Two common electrical connectors are snap-in connectors and multi-part connectors. Snap-in connectors use a snap-in ring to quickly connect to a junction box, and multipart connectors use threaded, multipart lock-nut components. Various types of wiring can be pulled into a conduit, which simplifies building design and construction as well as building renovations, since wiring can be added or replaced by pulling through the existing conduit.

However, wiring is frequently damaged during such pulls due to the interaction of the wiring on the fittings that are used, often resulting in the wiring insulation being damaged and/or removed from sections. Since the use and installation details for conduit are governed by various building codes, this kind of damage can make the difference between a successful inspection or an inspection that requires re-installation.

One way to reduce the incidence of damaging the wiring is to install the wiring in two person teams with one person feeding the wire while the other pulls it through the conduit. However, this doubles the labor cost both in terms of actual expenses as well as efficiency.

Another solution has been to use a plastic bushing to cover the sharp edges that might damage the wiring. Plastic bushings are intended to protect already installed wire during hot/cold expansion or mechanical movement. However, and although the plastic bushings are helpful for already installed wire, they are nonetheless sharp enough to damage wire during pulling and are not designed for this.

Significant problems also arise with the fittings. For instance, snap-in electrical connectors are known to be problematic for having a loose electrical connection, which can be dangerous, and they allow contaminants to enter the connection. Multipart connectors are known to be problematic for many reasons, including the inherent clumsiness of the required disassembly and reassembly, use of special tools for tightening, the potential of lost locknuts, cross-threading of the locknuts, the large amount of space used within the junction box, and the non-optional destruction of the connector that occurs during disassembly.

Additionally, suitable sockets are not available for locking hub nut devices that address the problems in the prior art.

There remains a need for a socket for a locking hub nut that does not damage the wiring during pulling, frees up manpower by allowing one person rather than two to be able to do the pulling, has a simplified design, and which has universal threading for conduit of all currently approved sizes and materials.

BRIEF SUMMARY OF THE INVENTION

Accordingly, provided herein in order to address problems in the prior art is an electrical conduit socket, comprising: an annular ring having a top edge and a bottom edge; a planar cover plate attached to the top edge of the annular ring defining a cavity; the annular ring having an inner surface and an outer surface, the inner surface having three identical arch-shaped recesses positioned equidistant from each other, the arch-shaped recesses indented into the inner surface and having an arch portion adjacent the top of the annular ring and a flat portion adjacent the bottom of the annular ring; a box-shaped recess located at the center of the planar cover plate, the box-shaped recess comprised of four side walls and a bottom panel, the bottom panel having a through-hole for receiving a wire, the through-hole having a plurality of rounded wire guide recesses within the edge of the through-hole; and the top edge of the annular ring having a channel configured to receive an electrical conduit locking nut having a round top sidewall.

In a preferred embodiment, the socket has threading on the inner surface of the annular ring, or the inner surface of the annular ring may be smooth.

In a preferred embodiment, there is an electrical conduit socket, wherein the channel of the top edge of the annular ring is configured to receive a round top sidewall of an electrical conduit locking nut wherein the round top sidewall is composed of, starting from the outer surface of the sidewall, a neck region leading to a vertical surface that continues over a dome region that extends along a smooth pull surface to a rounded circular area.

In a preferred embodiment, the electrical connector further comprises wherein the locking hub nut has a central axial bore that is sized to engage with conduit of a specific diameters, said conduit diameter selected from a group of standard conduit sizes comprising ½", ¾, 1", 1¼", 1¼", 2", 2½", 3", 3½", 4", 5", and 6".

In a preferred embodiment, the electrical connector further comprises wherein the socket has a central axial bore sized to engage conduit of a diameter comprising ½", ¾", or 1".

In a preferred embodiment, the electrical connector further comprises wherein the external surface has a plurality of screw lugs, wherein said screw lugs function as a conduit engagement system with one or more setscrews inserted into a through-hole of said screw lugs, and wherein said conduit engagement system provides a mechanism for securing conduit into position.

In a preferred embodiment, the electrical connector further comprises wherein the flat end has gripping projections that allow the socket to engage with a surface and increase the frictional interaction to substantially prevent unwanted rotation.

In a preferred embodiment, the electrical connector further comprises wherein the socket is manufactured from galvanized steel or die-cast zinc.

BRIEF DESCRIPTION OF THE DRAWINGS

The invention will be further explained with reference to the appended Figures, wherein like structure is referred to by like numerals through the several views.

FIG. 4 shows a perspective top view and a perspective bottom view of one embodiment of the inventive electrical conduit socket having a small diameter and proportional dimensions.

FIG. 5 shows a top view, a side/plan view, and a cross-sectional view of one embodiment of the inventive electrical conduit socket having a small diameter and proportional dimensions.

FIG. 6 shows a perspective top view and a perspective bottom view of one embodiment of the inventive electrical conduit socket having a smaller diameter and proportional dimensions.

FIG. 7 shows a top view, a side/plan view, and a cross-sectional view of one embodiment of the inventive electrical conduit socket having a smaller diameter and proportional dimensions.

FIG. 9 shows a top view, a side/plan view, and a cross-sectional view of one embodiment of the inventive electrical conduit socket having a very small diameter and proportional dimensions.

FIG. 12 is a top view of one embodiment of the inventive electrical conduit lock nut that the socket is configured to join in an interlocking or coupling action.

FIG. 13 is a plan or side view of one embodiment of the inventive electrical conduit lock nut that the socket is configured to join in an interlocking or coupling action.

DETAILED DESCRIPTION OF THE INVENTION

Following are more detailed descriptions of various related concepts related to, and embodiments of, methods and apparatus according to the present disclosure. It should be appreciated that various aspects of the subject matter introduced above and discussed in greater detail below may be implemented in any of numerous ways, as the subject matter is not limited to any particular manner of implementation. Examples of specific implementations and applications are provided primarily for illustrative purposes.

Referring now to the figures, the sockets herein are configured to operate cooperatively with an electrical connector locking hub nut.

Figure 1:
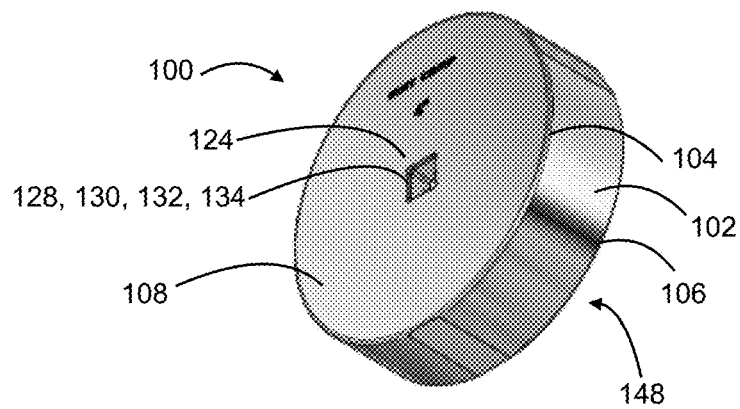
FIG. 1 shows a perspective top view of one embodiment of the inventive electrical conduit socket.
Figure 2:
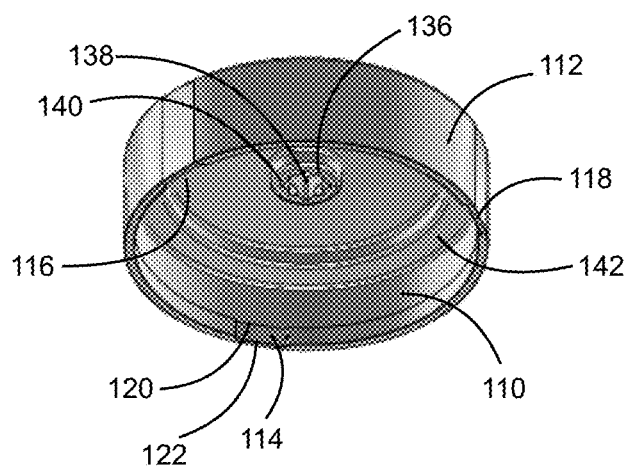
FIG. 2 shows a perspective bottom view of one embodiment of the inventive electrical conduit socket.

FIG. 1 and FIG. 2 show a perspective top and bottom view of one embodiment of the inventive electrical conduit socket. FIG. 1 and FIG. 2 show the electrical conduit socket cap 100, comprising: an annular ring 102 having a top edge 104 and a bottom edge 106; a planar cover plate 108 attached to the top edge 104 of the annular ring 102 defining a cavity 148; the annular ring 102 having an inner surface 110 and an outer surface 112, the inner surface 110 having three identical arch-shaped recesses 114, 116, 118 positioned equidistant from each other, the arch-shaped recesses 114, 116, 118 indented into the inner surface 110 and having an arch portion 120 adjacent the top 104 of the annular ring 102 and a flat portion 122 adjacent the bottom 106 of the annular ring 102; a box-shaped recess 124 located at the center 126 of the planar cover plate 108, the box-shaped recess 124 comprised of four side walls 128, 130, 132, 134 and a bottom panel 136, the bottom panel 136 having a through-hole 138 for receiving a wire, the through-hole 138 having a plurality of rounded wire guide recesses 140 within the edge of the through-hole 138; and the top edge 104 of the annular ring 102 having a channel 142 configured to receive an electrical conduit locking nut having a round top sidewall.

Figure 14:
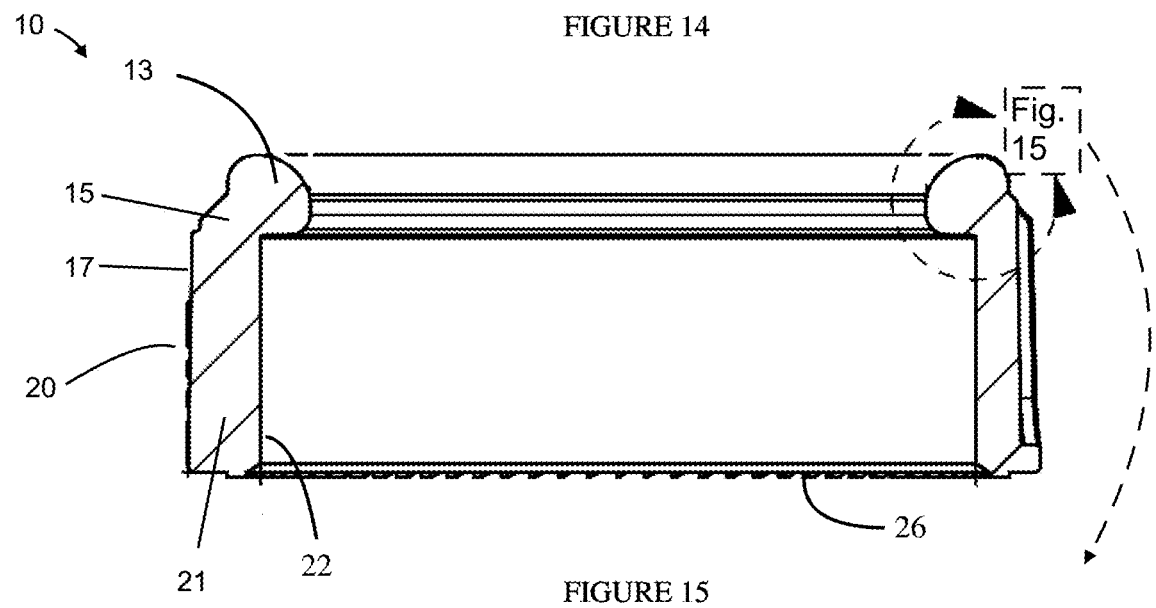
FIG. 14 is a cross-sectional view along A-A of one embodiment of the inventive electrical conduit lock nut that the socket is configured to join in an interlocking or coupling action.

FIG. 2 shows a perspective bottom view of one embodiment of the inventive electrical conduit socket. FIG. 2 shows a channel 142 at the top edge 104 of the inner surface 110 of the annular ring 102 and that it is configured to receive a round top sidewall of an electrical conduit locking nut (not shown—see FIG. 10-19). The channel 142 can accommodate many shapes. In one preferred embodiment, the channel 142 accommodates wherein the round top sidewall shown in FIG. 14 is composed of, starting from the outer surface of the sidewall, a neck region 13 leading to a vertical surface that continues over a dome region that extends along a smooth pull surface to a rounded circular area.

Figure 3:
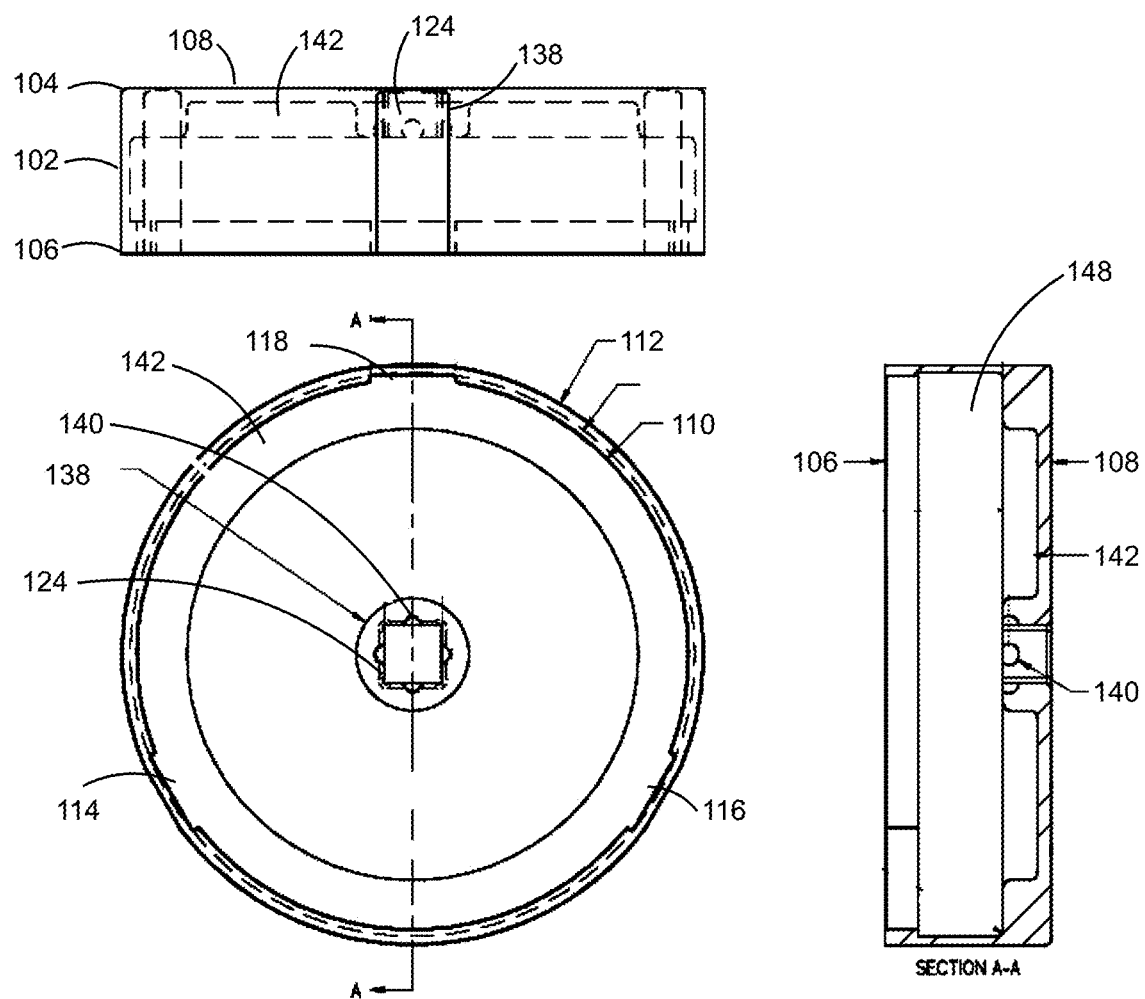
FIG. 3 shows a top view, a side/plan view, and a cross-sectional view of one embodiment of the inventive electrical conduit socket.

FIG. 3 shows a top view, a side/plan view, and a cross-sectional view of one embodiment of the inventive electrical conduit socket cap having recesses 1144, 116, 118, and cavity 148. FIG. 3 shows the annular ring 102 and the box-shaped recess 124 in the top plate component 108, along with the channel 142. FIG. 3 also shows the recesses 140 in the box 124 that can guide wires from the conduit.

FIG. 4 shows a perspective top view and a perspective bottom view of one embodiment of the inventive electrical conduit socket cap 200 having a small diameter and proportional dimensions. FIG. 5 shows a top view, a side/plan view, and a cross-sectional view of one embodiment of the inventive electrical conduit socket having a small diameter and proportional dimensions.

FIG. 6 shows a perspective top view and a perspective bottom view of one embodiment of the inventive electrical conduit socket cap 300 having a smaller diameter and proportional dimensions. FIG. 7 shows a top view, a side/plan view, and a cross-sectional view of one embodiment of the inventive electrical conduit socket cap 300 having a smaller diameter and proportional dimensions. FIG. 7 also shows three recesses 314, 316, 318 for receiving a size-matched locking hub nut.

Figure 8:
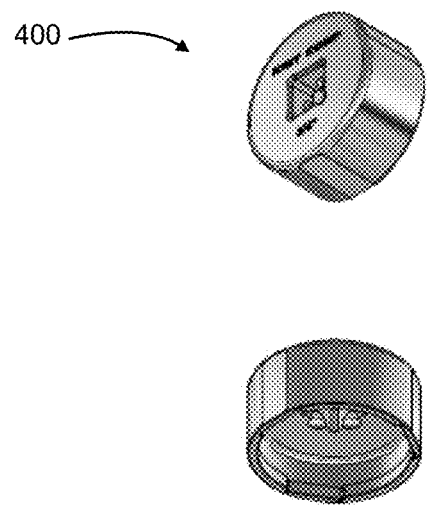
FIG. 8 shows a perspective top view and a perspective bottom view of one embodiment of the inventive electrical conduit socket having a very small diameter and proportional dimensions.

FIG. 8 shows a perspective top view and a perspective bottom view of one embodiment of the inventive electrical conduit socket cap 400 having a very small diameter and proportional dimensions. FIG. 9 shows a top view, a side/plan view, and a cross-sectional view of one embodiment of the inventive electrical conduit socket having a very small diameter and proportional dimensions.

Figure 10:
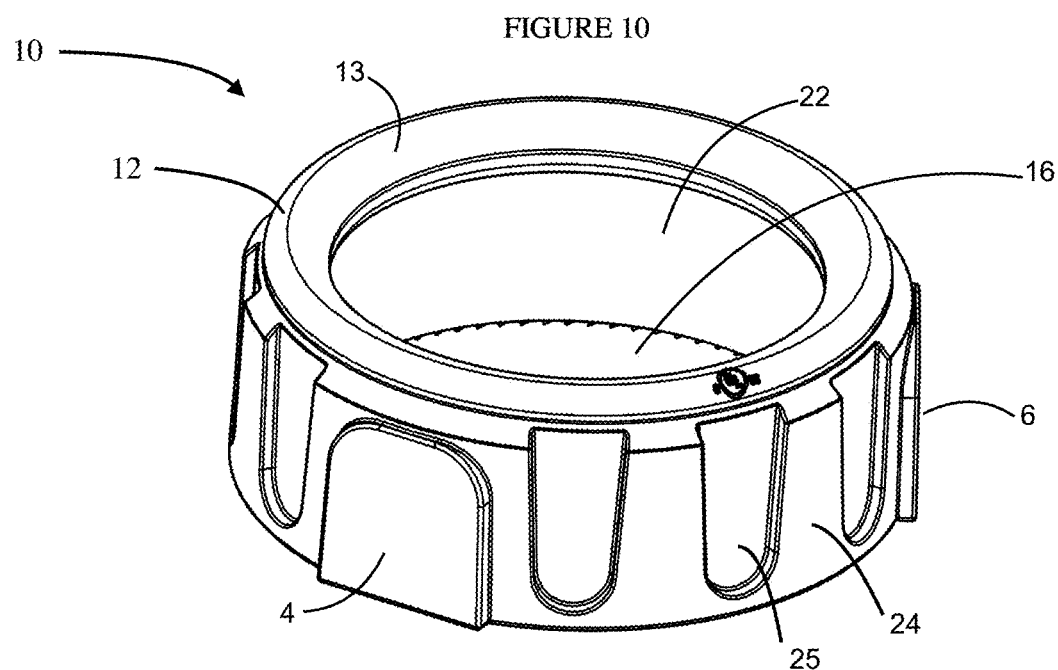
FIG. 10 shows a perspective view of one embodiment of the inventive electrical conduit lock nut that the socket is configured to join in an interlocking or coupling action.

FIG. 10 shows a perspective view of one embodiment of the inventive electrical conduit lock nut 10 that the socket cap 100-400 is configured to join in an interlocking or coupling action with the lug panels 4, 6, 8 fitting into recesses 114, 116, 118 of the socket cap 10.

FIG. 10 shows the lock nut 10 having a protective rounded rim 12 to avoid wire insulation damage. Specifically, the lock nut 10 comprises: a locking hub nut 10, wherein said locking hub nut 10 is toroid-shaped and has a rounded end 12 and a flat end 14, said locking hub nut 10 having a central axial bore 16 extending therethrough, said locking hub nut 10 having an external surface 20 having a plurality of ribs and recesses 24, 25 for cooperative engagement during conduit installation, wherein central axial bore 16 is screw-threaded along an inner surface 22, wherein the rounded end 12 has a rounded rim 13, said rounded rim 13 having a substantially smooth surface and extending inwardly into the central axial bore 16, wherein upon threading wiring through the central axial bore 16 the rounded rim guides the wiring travelling therethrough in such a manner that there is minimal interaction with any sharp edges while being pulled through a length of conduit and interacting with the locking hub nut 10 during such a pull operation, and wherein the locking hub nut 10 has a height from flat end 14 to rounded end 12 of from about 11 mm to about 16 mm and provides for engagement with a junction box without using a traditional lock nut.

Figure 11:
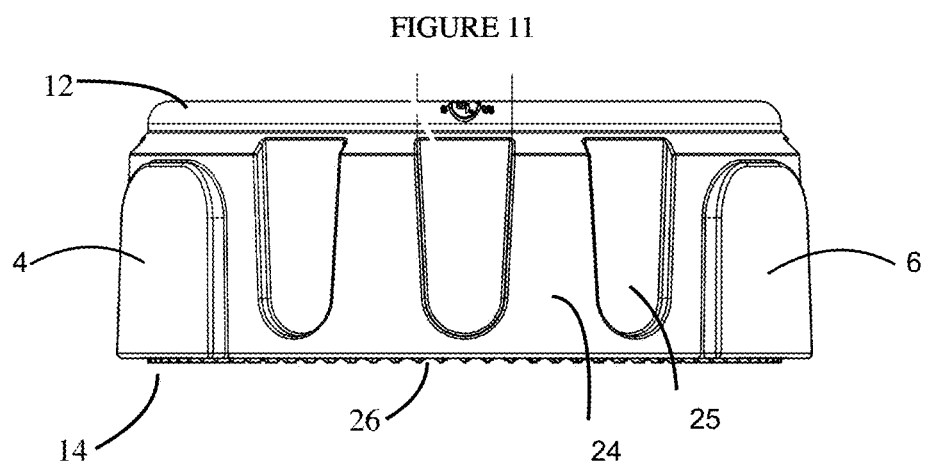
FIG. 11 is a plan or side view of one embodiment of the inventive electrical conduit lock nut that the socket is configured to join in an interlocking or coupling action.

FIG. 11 shows the locking nut 10 further comprises wherein flat end 14 has gripping projections 26 that allow the locking hub 10 nut to engage with the junction box and increase the frictional interaction to substantially prevent unwanted rotation.

FIGS. 12 and 13 illustrate that the locking hub nut 10 is a toroid-shaped unit having a rounded end 12 and flat end 14. Rounded end has a rounded rim 12 a which is substantially smooth and functions to guide conduit wiring (not shown) away from damaging sharp edges and substantially prevents damage to the wire insulation. Locking hub nut 10 has an internal central bore 16 which is concentric with axis 18, and an external surface 20 having a plurality of inset panels 24, 25 which permits engagement by a suitable installation tool for tightening. Internal central bore 16 may be smooth or may be screw-threaded along the inner surface 22. External surface 20 is composed of a plurality of inset panels 24, 25 in an alternating arrangement with multiple lug panels 4, 6, 8. The inset panels 24, 25 may have any geometric configuration that permits grasping or attachment by hand or tool. In a non-limiting example, the external surface 22 has a plurality of inverted parabolic inset panels or window-slots 25 defining a series of columnar supports 24 around the periphery of the sidewall of the locking hub nut 10. The column support or ribs 24 allow for engagement by a common channel lock pliers (not shown), rather than requiring any special tightening tool or risking damage to the screw-driver which is commonly used by electricians to tighten such nuts. Columns 24, without limitation, are here composed of recess 25 and projection 24.

The rounded end 12 is the portion of the locking hub nut 10 that interacts with the wire (not shown) being pulled through the conduit and provides a smooth surface so as not to damage, or rip, the insulation that covers electrical wires. In operation, rounded rim 13 extends inwardly into the topmost space of the central bore 16 such that when the unit (nut 10) is viewed from directly above and looking through the bore 16, the rounded rim or rounded lip 13 can be seen to guide a wire travelling therethrough in such a manner that there is little or no interaction with the threaded sidewalls nor with any edged or sharp or otherwise damaging surface that a wire might encounter while be pulled through a length of conduit and interacting with the locking hub nut during such a pull operation.

Figure 15:
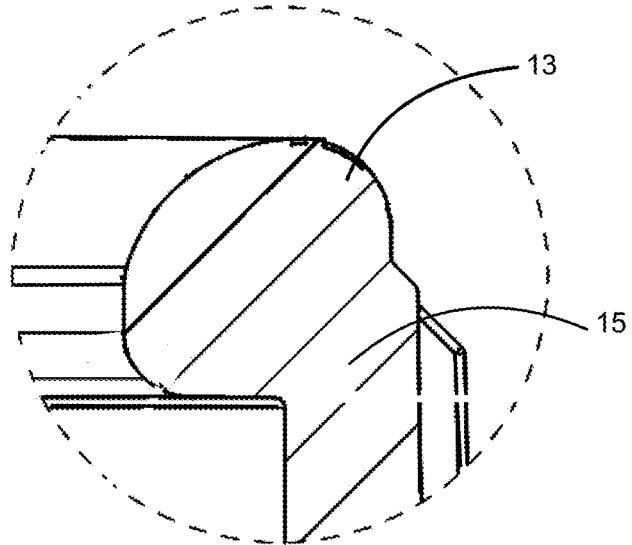
FIG. 15 is a close-up detail view of the rounded pull surface and shoulder of the rounded rim of one embodiment of the inventive electrical conduit lock nut that the socket is configured to join in an interlocking or coupling action.

FIGS. 14 and 15 illustrate the rounded top 13 of the side wall is composed of, starting from the outer surface 20 of the sidewall 21, e.g. outside to inside, a neck region 15 leading to a vertical surface 17 that continues over a dome region that extends along a smooth pull surface. The pull surface curves around a rounded circular area defining a horizontal overhead section that leads to the inner surface 22 of the sidewall. This rounded structure provides a beaded or domed rim for the top of the sidewall of the locking hub nut 10.

Figure 16:
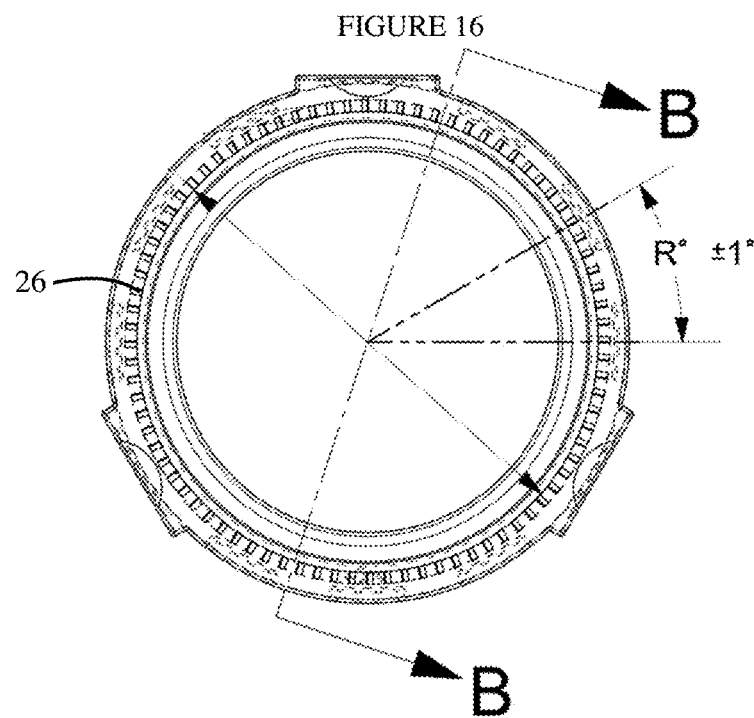
FIG. 16 is a bottom view of one embodiment of the inventive electrical conduit lock nut.
Figure 17:
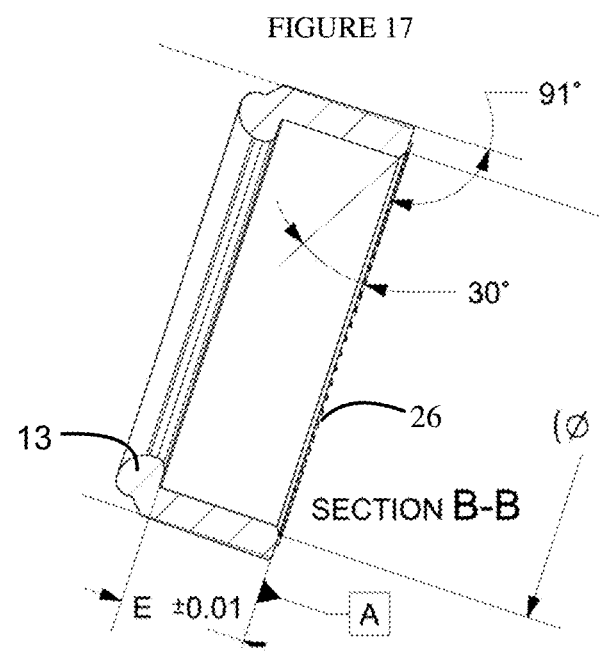
FIG. 17 is a cross-sectional view along B-B of one embodiment of the inventive electrical conduit lock nut that the socket is configured to join in an interlocking or coupling action.

FIG. 16 and FIG. 17 show that the flat end 14 may be outfitted with gripping projections 26 such as a plurality of teeth, knobs, knurling, checkering, texturing, or surface features that allow the locking hub nut to engage with the junction box and increase the frictional interaction to substantially prevent unwanted rotation. FIG. 17 shows rounded lip 13.

Figure 18:
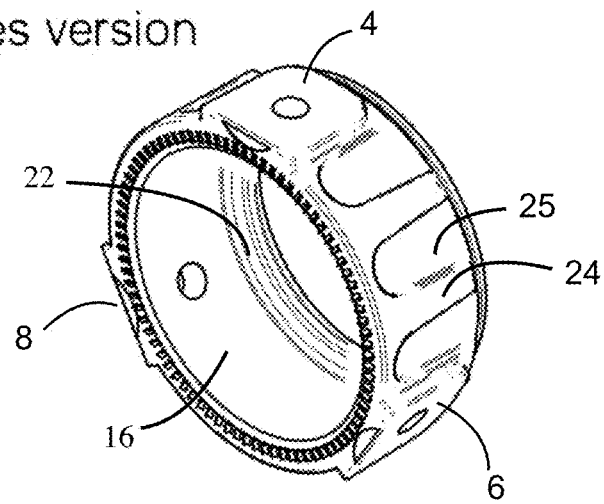
FIG. 18 is a perspective view of one embodiment of the inventive electrical conduit lock nut with lug holes.
Figure 19:
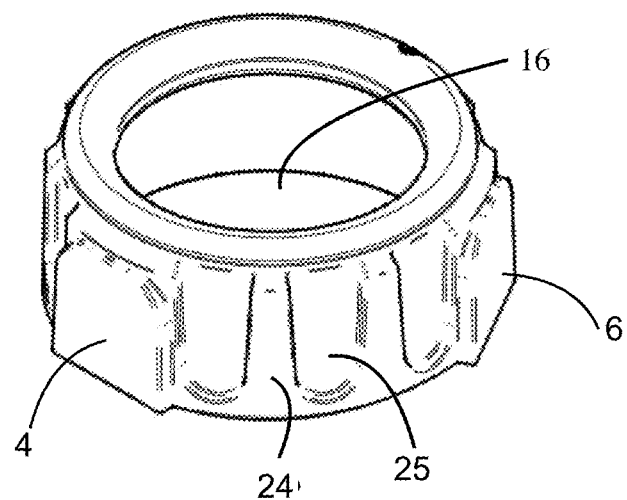
FIG. 19 is a perspective view of one embodiment of the inventive electrical conduit lock nut without lug holes.

FIGS. 18 and 19 shows that the internal central bore 16 may be smooth or may be screw-threaded for universal engagement with current types of conduit and connectors. FIGS. 18 and 19 show recesses and ribs 25, 24, along with lug panels 4, 6, 8, that may include lug holes or may have unperforated panels. Importantly, the unit is constructed with enough threads such that it is tall enough to eliminate the need for a traditional lock nut, thus simplifying the installation and reducing the number of parts required for installing conduit. Since most junction boxes are 3/16" thick, the locking hub nut 10 provided herein fits over existing connectors and provides a flush fit, with no edge. In preferred embodiments, the unit ranges in height from:

about 11 mm to about 16 mm, and from
about 12 mm to about 15 mm, and from
about 12.5 mm to about 13.5 mm, and from
about 12.8 mm to about 13.2 mm, and also includes without limitation each independent value therebetween. In preferred embodiments, the locking nuts are sized to fit conduit having the following standard (inner bore) dimensions (inches): ½", ¾", 1", 1¼", 1½", 2", 2½", 3", 3½", and 4".

In one preferred embodiment, the threading 22 has a 1.8 pitch, but which can be varied according to the need.

The locking nut 10 is manufactured to accommodate conduit of many bore diameters, including all standard sizes such as ½", ¾, 1", 1¼", 1½", 2", 2½", 3", 3½", 4", 5", and 6". In one of the preferred embodiment, the locking hub nut 10 is capable of engageably threading onto conduit of diameter ½", or ¾", or 1".

In preferred embodiments, the socket cap and locking hub nut are manufactured from galvanized steel. In other preferred embodiment, as with other electrical fittings for general purpose use with metal conduits, may be made of die-cast zinc, but where stronger fittings are needed, they are made of copper-free aluminum or cast iron. Alternatively, it may be nickel coated.

The unit is preferably made from a poured mould. Casting methods are well known and include without limitation investment casting, die casting, vacuum casting, and centrifuge casting. Although galvanized steel is preferred for economic reasons, the unit may also be made from any hard conductive metal, alloy, or composite.

Conduit systems are classified by the wall thickness of tubing, mechanical stiffness of the tubing, and material used to make the tubing. Locking hub nut 10 provides a universal solution for many types of conduit including the following.

Example: Rigid Metal Conduit (RMC)

Rigid Metal Conduit (RMC) is a thick threaded tubing, usually made of coated steel, though it may be aluminum. Thicker-walled than IMC.

Example: Rigid Nonmetallic Conduit (RNC)

Rigid Nonmetallic Conduit (RNC) is a non-metallic unthreaded tubing.

Example: Galvanised Rigid Conduit (GRC)

Galvanised rigid conduit (GRC) is galvanised steel tubing, with a tubing wall that is thick enough to allow it to be threaded. Its common applications are in commercial and industrial construction.

Example: Electrical Metallic Tubing (EMT)

Electrical metallic tubing (EMT), sometimes called thin-wall, is commonly used instead of galvanised rigid conduit (GRC), as it is less costly and lighter than GRC. EMT is not threaded. Lengths of conduit are connected to each other and to equipment with clamp-type fittings. Like GRC, EMT is more common in commercial and industrial buildings than in residential applications. EMT is generally made of coated steel, though it may be aluminum.

Example: Electrical Nonmetallic Tubing (ENT)

Electrical Nonmetallic Tubing (ENT) is a thin-walled corrugated tubing that is moisture-resistant and flame retardant. It is pliable such that it can be bent by hand and is often flexible although the fittings are not. It is not threaded due to its corrugated shape although the fittings might be.

Example: Flexible Metallic Conduit (FMC), Armored Cable (Type AC), and Metallic-Clad (Type MC) Cable Flexible Metallic Conduit (FMC) is made through the coiling of a self-interlocked ribbed strip of aluminum or steel, forming a hollow tube through which wires can be pulled. Armored (Type AC) and Metallic-Clad (Type MC) cables are very similar in appearance to FMC. The difference between FMC and AC or MC is that FMC is a conduit and AC/MC are sheathed cable.

Example: Liquidtight Flexible Metal Conduit (LFMC)

Liquidtight Flexible Metal Conduit (LFMC) is a non-metallic and liquidtight jacket covering a flexible metal interior. The interior is similar to FMC.

Example: Flexible Metallic Tubing (FMT)

Flexible Metallic Tubing (FMT) is a liquidtight metallic tubing but unlike LFMC, it lacks a non-metallic jacket.

Liquidtight Flexible Nonmetallic Conduit (LNFC)

Liquidtight Flexible Nonmetallic Conduit (LNFC) refers to several types of flame-resistant non-metallic tubing. Interior surfaces may be smooth or corrugated. There may or may not be integral reinforcement within the conduit wall. It is also known as FNMC.

Aluminum Conduit

Aluminum conduit, similar to Galvanized Metal Conduit (GMC), is a rigid conduit, generally used in commercial and industrial applications, where a higher resistance to corrosion is needed.

Intermediate Metal Conduit (IMC)

Intermediate Metal Conduit (IMC) is a steel tubing heavier than EMT but lighter than RMC. It may be threaded.

PVC Conduit

PVC conduit is the lightest in weight compared to other conduit materials, and usually lower in cost than other forms of conduit. In North American electrical practice, it is available in three different wall thicknesses, with the thin-wall variety only suitable for embedded use in concrete, and heavier grades suitable for direct burial and exposed work. The various fittings made for metal conduit are also made for PVC. The plastic material resists moisture and many corrosive substances, but since the tubing is non-conductive an extra bonding (grounding) conductor must be pulled into each conduit.

Having thus described several illustrative embodiments, it is to be appreciated that various alterations, modifications, and improvements will readily occur to those skilled in the art. Such alterations, modifications, and improvements are intended to be part of this disclosure, and are intended to be within the spirit and scope of this disclosure. While some examples presented herein involve specific combinations of functions or structural elements, it should be understood that those functions and elements may be combined in other ways according to the present invention to accomplish the same or different objectives. In particular, acts, elements, and features discussed in connection with one embodiment are not intended to be excluded from similar or other roles in other embodiments. Accordingly, the foregoing description and attached drawings are by way of example only, and are not intended to be limiting.

It will be clear to a person of ordinary skill in the art that the above embodiments may be altered or that insubstantial changes may be made without departing from the scope of the invention. Accordingly, the scope of the invention is determined by the scope of the following claims and their equitable Equivalents.

We claim:

1. An electrical conduit socket, comprising:
   an annular ring having a top edge and a bottom edge;
   a planar cover plate attached to the top edge of the annular ring defining a cavity;
   the annular ring having an inner surface and an outer surface, the inner surface having three identical arch-shaped recesses positioned equidistant from each other, the arch-shaped recesses indented into the inner surface and having an arch portion adjacent the top of the annular ring and a flat portion adjacent the bottom of the annular ring;
   a box-shaped recess located at the center of the planar cover plate, the box-shaped recess comprised of four side walls and a bottom panel, the bottom panel having a through-hole for receiving a wire, the through-hole having a plurality of rounded wire guide recesses within the edge of the through-hole; and
   the top edge of the annular ring having a channel configured to receive an electrical conduit locking nut having a round top sidewall.

2. The electrical conduit socket of claim 1, wherein the channel of the top edge of the annular ring is configured to receive a round top sidewall of an electrical conduit locking nut wherein the round top sidewall is composed of, starting from the outer surface of the sidewall, a neck region leading to a vertical surface that continues over a dome region that extends along a smooth pull surface to a rounded circular area.

3. The electrical conduit socket of claim 1, wherein the socket has a central axial bore that is sized to engage with conduit of a specific diameters, said conduit diameter selected from a group of standard conduit sizes comprising ½", ¾", 1", 1¼", 1½", 2", 2½", 3", 3½", 4", 5", and 6".

4. The electrical conduit socket of claim 1, wherein the socket has a central axial bore sized to engage conduit of a diameter comprising ½", ¾", or 1".

5. The electrical conduit socket of claim 1, wherein the external surface of the socket has a plurality of screw lugs, wherein said screw lugs function as a conduit engagement system with one or more setscrews inserted into a through-hole of said screw lugs, and wherein said conduit engagement system provides a mechanism for securing conduit into position.

6. The electrical conduit socket of claim 1, wherein the socket has gripping projections that allow the socket to engage with a surface and increase the frictional interaction to substantially prevent unwanted rotation.

7. The electrical conduit socket of claim 1, wherein the socket is manufactured from galvanized steel or die-cast zinc.

\* \* \* \* \*